(12) United States Patent
Maiti et al.

(10) Patent No.: US 8,716,388 B2
(45) Date of Patent: *May 6, 2014

(54) POLYCARBONATE NANOCOMPOSITES

(71) Applicant: SABIC Innovative Plastics IP BV, Pittsfield, MA (US)

(72) Inventors: Parnasree Maiti, Bangalore (IN); Sonia Oberoi, Edison, NJ (US); Roopali Rai, Bangalore (IN); Vaidyanath Ramakrishnan, Bergen op Zoom (NL); Sandeep Tvagi, Linz (AT)

(73) Assignee: SABIC Innovative Plastics IP B.V., Bergan op Zoom (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/775,634

(22) Filed: Feb. 25, 2013

(65) Prior Publication Data

US 2013/0165547 A1 Jun. 27, 2013

Related U.S. Application Data

(63) Continuation of application No. 12/057,880, filed on Mar. 28, 2008, now Pat. No. 8,389,626.

(51) Int. Cl.
*C08K 3/08* (2006.01)
(52) U.S. Cl.
USPC ........... 524/439; 524/492; 524/493; 524/779; 524/780; 524/781; 524/783; 524/785
(58) Field of Classification Search
USPC ............... 524/439, 493–493, 785, 492–493, 524/777–783
See application file for complete search history.

(56) References Cited

U.S. PATENT DOCUMENTS

| 6,712,997 B2 | 3/2004 | Won et al. |
| 2008/0081865 A1 | 4/2008 | Biswas et al. |

FOREIGN PATENT DOCUMENTS

| CN | 101092506 A | 12/2007 |
| JP | 2004359740 A | 12/2004 |
| JP | 2006299126 A | 11/2006 |
| WO | WO2008/042496 | 4/2008 |

OTHER PUBLICATIONS

Onbattuvelli, Valmikanathan P., An Abstract of the Thesis of Valmikanathan P. Onbattuvelli for the degree of Master of Science in Industrial Engineering presented on Jun. 15, 2007, "Synthesis and Characterization of Palladium/Polycarbonate Nanocomposites".
Dan et al., "Effect of Polymeric Media on the Kinetics of Nanocluster Nucleation and Growth", Macromolecules 2005, 38, 9243-9250, 2005 American Chemical Society.
Tadd et al., "Spatial Distribution of Cobalt Nanoclusters in Block Copolymers", Langmuir 2002, 18, 2378-2384, 2002 American Chemical Society.
PCT International Search Report for International Patent Application No. PCT/US2009/038481.
JP2006299126A, published Nov. 2, 2006, Applicants, Mitsubishi Chem Corp. and Nissan Motor Co., Ltd. (machine translation).
JP2004359740A, published Dec. 24, 2004, Applicant, Nissan Motor Co., Ltd., Japan (machine translation).
CN101092506A, published Dec. 26, 2007, Applicant, Shanghai University (machine translation).

*Primary Examiner* — Peter Szekely
(74) *Attorney, Agent, or Firm* — Richard M. Klein; Fay Sharpe LLP

(57) ABSTRACT

Polycarbonate nanocomposites comprising a polycarbonate matrix having non-oxidized metal nanoparticles dispersed therein are disclosed. The polycarbonate nanocomposite is produced by a process comprising forming a reaction mixture comprising a dihydroxy compound, an activated carbonate, a metal precursor, and a solvent; and in-situ polymerizing the reaction mixture to form a nanocomposite comprising a polycarbonate matrix and metal nanoparticles dispersed therein. The metal precursor comprises a metal selected from a specified group. The nanocomposites have improved mechanical, optical, electrical and/or magnetic properties. Also disclosed are articles formed from such polycarbonate nanocomposites.

20 Claims, 3 Drawing Sheets

POLYCARBONATE NANOCOMPOSITES

This application is a continuation of U.S. patent application Ser. No. 12/057,880, filed on Mar. 28, 2008, now U.S. Pat. No. 8,389,626. The entire disclosure of that application is hereby fully incorporated by reference herein.

BACKGROUND

The present disclosure relates generally to polycarbonate nanocomposites prepared by forming metal nanoparticles in-situ during the polymerization of polycarbonates. Processes for producing such polycarbonate nanocomposites, as well as articles formed from the same, are also disclosed.

Nanocomposites are particle-filled polymers for which at least one of the dimensions of the dispersed particles is in the nanometer ($10^{-9}$ meter) or nanoscale range (typically from about 1 to about 20 nanometers). Nanocomposites often have superior physical and mechanical properties over their microcomposite counterparts, such as improved modulus, reduced gas permeability, flame retardance, and improved scratch resistance. Moreover, the nanoscale dispersion of the particles within the polymer frequently does not produce the brittleness and opacity typically found in microcomposites or larger sized particles.

Nanocomposites may be made from ex-situ melt blending processes. However, in conventional melt blending processes, relatively uniform dispersion of nanoparticles within the polymer, such as a polycarbonate matrix, is difficult to achieve. Typically, the nanoparticles remain largely localized in the form of agglomerates in the polycarbonate matrix.

Additionally, some nanoparticle generation processes require intermediate temperature or time conditions for optimum sized particles. However, melt blending can be incompatible with such processes.

Nanoparticles may also be generated from metal salt solutions. Unfortunately, conventional melt blending processes can restrict the volume of solvent which can be added, thus restricting nanoparticle formation.

Sometimes, higher levels of nanoparticles can be added to the polycarbonate matrix to increase a desired property. However, this use of higher levels may also increase the desired property to the detriment of other properties. For example, higher levels can result in a nanocomposite having inferior optical properties, such as reduced transparency or increased haze.

There remains a need for methods that reduce degradation of the polymer matrix in the presence of well-dispersed nanoparticles. There is also a need for polycarbonate nanocomposites having improved thermo-mechanical, optical, electrical, or magnetic properties and improved color.

BRIEF DESCRIPTION

Disclosed herein, in various embodiments, are nanocomposites comprising a polycarbonate matrix and metal nanoparticles dispersed therein. Also disclosed are processes for forming such nanocomposites.

In some embodiments, a method for producing a polycarbonate nanocomposite is disclosed. The method comprises: forming a reaction mixture comprising a dihydroxy compound, an activated carbonate, a metal precursor, and a solvent; and in-situ polymerizing the reaction mixture to form a polycarbonate nanocomposite comprising metal nanoparticles dispersed within a polycarbonate matrix. The metal precursor comprises a metal selected from the group consisting of cobalt, rhodium, iridium, copper, silver, gold, platinum, palladium, iron, nickel, manganese, samarium, neodymium, praseodymium, gadolinium, titanium, zirconium, silicon, indium, scandium, yttrium, lanthanum, cerium, promethium, europium, terbium, holmium, erbium, thulium, ytterbium, and lutetium.

In some embodiments, the metal is selected from the group consisting of cobalt, rhodium, iridium, copper, silver, gold, platinum, and palladium.

The solvent may be a polar solvent. The boiling point of the solvent may be equal to or greater than the melting point of the activated carbonate.

The reaction mixture may further comprise a stabilizer. The stabilizer can be selected from the group consisting of nano-sized fillers, solvents having coordinating groups, polymeric coordinating stabilizers, and organosilanes.

The metal precursor may be a metal salt.

The polycarbonate may have a weight average molecular weight of from about 20,000 to about 200,000, measured using polystyrene standards.

The metal nanoparticles may comprise 5 weight percent or less of the polycarbonate nanocomposite, based on the weight of the polycarbonate nanocomposite. They may also have a particle size of from about 1 to about 500 nanometers and/or an inter-particle distance (IPD) of from 0.05 nanometers to about 1500 nanometers.

The dihydroxy compound may have the structure of Formula (I):

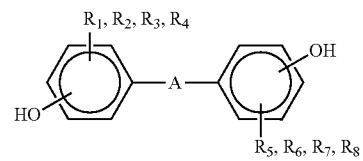

Formula (I)

wherein $R_1$ through $R_8$ are each independently selected from hydrogen, halogen, nitro, cyano, $C_1$-$C_{20}$ aliphatic, $C_1$-$C_{20}$ alkyl, $C_4$-$C_{20}$ cycloalkyl, and $C_6$-$C_{20}$ aryl; and A is selected from a bond, —O—, —S—, —SO$_2$—, $C_1$-$C_{12}$ alkyl, $C_6$-$C_{20}$ aromatic, $C_6$-$C_{20}$ cycloaliphatic, and $C_1$-$C_{20}$ aliphatic. In particular embodiments, the dihydroxy compound is 2,2-bis(4-hydroxyphenyl)propane (bisphenol-A).

The activated carbonate may have the structure of Formula (II):

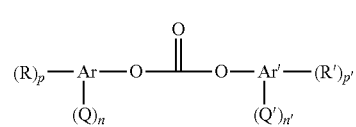

Formula (II)

wherein Q and Q' are independently selected from alkoxycarbonyl, halogen, nitro, amide, sulfone, sulfoxide, imine, and cyano; Ar and Ar' are independently aromatic rings; n and n' are independently whole numbers from zero up to the number of replaceable hydrogen groups substituted on the aromatic rings Ar and Ar', wherein (n+n')≥1; p and p' are integers; and R and R' are independently selected from alkyl, substituted alkyl, cycloalkyl, alkoxy, aryl, alkylaryl having from 1 to 30 carbon atoms, cyano, nitro, halogen, and carboalkoxy. In particular embodiments, the activated carbonate is bis(methylsalicyl)carbonate.

The reacting step may comprise maintaining the reaction mixture at a first temperature of from about 50° C. to about 230° C. and a first pressure of from about 800 millibar to about 1100 millibar for a first period of from about 15 minutes to about 60 minutes.

The reacting step may further comprise maintaining the reaction mixture at a second temperature of from about 210° C. to about 250° C. and a second pressure of from about 50 millibar to about 220 millibar for a second period of from about 5 minutes to about 65 minutes, the second temperature being equal to or greater than the first temperature.

The reacting step may further comprise maintaining the reaction mixture at a third temperature of from about 270° C. to about 310° C. and a third pressure of less than about 30 millibar for a third period of from about 5 minutes to about 35 minutes, the third temperature being greater than the second temperature and the third pressure being lower than the second pressure.

In other embodiments, a method for producing a polycarbonate nanocomposite during polymerization comprises:

forming an initial mixture comprising a dihydroxy compound and an activated carbonate;

reacting the initial mixture to form a reaction mixture comprising a low molecular weight polycarbonate;

adding a metal precursor and a solvent to the initial mixture to form a reaction mixture, wherein the metal precursor comprises a metal selected from the group consisting of cobalt, rhodium, iridium, copper, silver, gold, platinum, palladium, iron, nickel, manganese, samarium, neodymium, praseodymium, gadolinium, titanium, zirconium, silicon, indium, scandium, yttrium, lanthanum, cerium, promethium, europium, terbium, holmium, erbium, thulium, ytterbium, and lutetium; and heating the reaction mixture to form a polycarbonate nanocomposite during polymerization, wherein the nanocomposite comprises a high molecular weight polycarbonate and metal nanoparticles.

The heating step may be performed by:

maintaining the reaction mixture at a first temperature of from about 50° C. to about 230° C. and a first pressure of from about 800 millibar to about 1100 millibar for a first period of from about 15 minutes to about 60 minutes;

maintaining the reaction mixture at a second temperature of from about 210° C. to about 250° C. and a second pressure of from about 50 millibar to about 220 millibar for a second period of from about 5 minutes to about 65 minutes, the second temperature being equal to or greater than the first temperature; and maintaining the reaction mixture at a third temperature of from about 270° C. to about 310° C. and a third pressure of less than about 30 millibar for a third period of from about 5 minutes to about 35 minutes, the third temperature being greater than the second temperature and the third pressure being lower than the second pressure.

Polycarbonate nanocomposites produced by these methods are also disclosed, as well as articles formed therefrom.

In further embodiments, a polycarbonate nanocomposite is disclosed, comprising a polycarbonate matrix and non-oxidized metal nanoparticles dispersed in the polycarbonate matrix, wherein the metal nanoparticles comprise a metal selected from the group consisting of cobalt, rhodium, iridium, copper, silver, gold, platinum, palladium, iron, nickel, manganese, samarium, neodymium, praseodymium, gadolinium, titanium, zirconium, silicon, indium, scandium, yttrium, lanthanum, cerium, promethium, europium, terbium, holmium, erbium, thulium, ytterbium, and lutetium.

The metal nanoparticles may comprise 5 weight percent or less of the polycarbonate nanocomposite, based on the weight of the polycarbonate nanocomposite. The metal nanoparticles may have a particle size of from about 1 nanometer to about 500 nanometers. They may also have an inter-particle distance of from 0.05 nanometers to about 1500 nanometers.

Shaped articles formed from such nanocomposites, such as molded articles, etc., are also disclosed.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
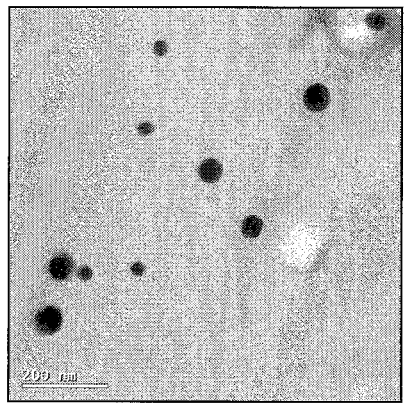
FIG. 1 is a transmission electron microscopy ("TEM") micrograph showing the morphology of a first exemplary nanocomposite comprising silver nanoparticles.

The polycarbonate nanocomposites disclosed herein, as well as processes for producing the same, can be used in applications where a combination of properties like transparency, hardness, and good melt flow for moldability are required. For example, these polycarbonate nanocomposites can be used for forming articles such as plastic storage containers, food packaging materials, ballistic protection materials, optical data storage materials, etc. Other uses and applications are also contemplated based upon the characteristics and properties of the polycarbonate nanocomposites produced.

As discussed in more detail, the polycarbonate nanocomposites are produced by forming a reaction mixture comprising a dihydroxy compound, an activated carbonate, a metal precursor, and a solvent, wherein the metal precursor comprises a specified metal. The reaction mixture is then in-situ polymerized to produce a polycarbonate nanocomposite comprising a polycarbonate matrix having metal nanoparticles dispersed therein.

The present disclosure may be understood more readily by reference to the following detailed description of specific embodiments and the examples included therein. In the following specification and the claims which follow, reference will be made to a number of terms which shall be defined to have the following meanings.

The singular forms "a," "an," and "the" include plural referents unless the context clearly dictates otherwise. All ranges disclosed herein are inclusive of the recited endpoint and independently combinable (for example, the range of "from 2 grams to 10 grams" is inclusive of the endpoints, 2 grams and 10 grams, and all the intermediate values).

The modifier "about" used in connection with a quantity is inclusive of the stated value and has the meaning dictated by the context (for example, it includes at least the degree of error associated with the measurement of the particular quantity).

The term "integer" means a whole number and includes zero. For example, the expression "n is an integer from 0 to 4" means n may be any whole number from 0 to 4, including 0.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, the aldehyde group —CHO is attached through the carbon of the carbonyl group.

The term "aliphatic" refers to a linear or branched array of atoms that is not cyclic and has a valence of at least one. Aliphatic groups are defined to comprise at least one carbon atom. The array of atoms may include heteroatoms such as nitrogen, sulfur, silicon, selenium and oxygen or may be composed exclusively of carbon and hydrogen ("Alkyl"). Aliphatic groups may be substituted or unsubstituted. Exemplary aliphatic groups include, but are not limited to, methyl, ethyl, isopropyl, isobutyl, chloromethyl, hydroxymethyl (—CH$_2$OH), mercaptomethyl (—CH$_2$SH), methoxy, methoxycarbonyl (CH$_3$OCO—), nitromethyl (—CH$_2$NO$_2$), and thiocarbonyl.

The term "alkyl" refers to a linear or branched array of atoms that is composed exclusively of carbon and hydrogen. The array of atoms may include single bonds, double bonds, or triple bonds (typically referred to as alkane, alkene, or alkyne). Exemplary alkyl groups include, but are not limited to, methyl, ethyl, and isopropyl.

The term "aromatic" refers to an array of atoms having a valence of at least one and comprising at least one aromatic group. The array of atoms may include heteroatoms such as nitrogen, sulfur, selenium, silicon and oxygen, or may be composed exclusively of carbon and hydrogen. The aromatic group may also include nonaromatic components. For example, a benzyl group is an aromatic group that comprises a phenyl ring (the aromatic component) and a methylene group (the nonaromatic component). Exemplary aromatic groups include, but are not limited to, phenyl, pyridyl, furanyl, thienyl, naphthyl, biphenyl, 4-trifluoromethylphenyl, 4-chloromethylphen-1-yl, and 3-trichloromethylphen-1-yl (3-CCl$_3$Ph-).

The term "cycloaliphatic" refers to an array of atoms which is cyclic but which is not aromatic. The cycloaliphatic group may include heteroatoms such as nitrogen, sulfur, selenium, silicon and oxygen, or may be composed exclusively of carbon and hydrogen. A cycloaliphatic group may comprise one or more noncyclic components. For example, a cyclohexylmethyl group (C$_6$H$_{11}$CH$_2$) is a cycloaliphatic functionality, which comprises a cyclohexyl ring (the array of atoms which is cyclic but which is not aromatic) and a methylene group (the noncyclic component). Exemplary cycloaliphatic groups include, but are not limited to, cyclopropyl, cyclobutyl, 1,1,4,4-tetramethylcyclobutyl, piperidinyl, and 2,2,6,6-tetramethylpiperydinyl.

The polycarbonate nanocomposite comprises a polycarbonate polymer. The polycarbonate polymer forms a matrix in which the metal nanoparticles are dispersed. As used herein, "polycarbonate" refers to an oligomer or polymer comprising residues of one or more dihydroxy compounds joined by carbonate linkages; it also encompasses poly(carbonate-co-ester) oligomers and polymers.

Polycarbonate polymers generally contain a repeating structural carbonate unit of the formula (1):

in which at least 60 percent of the total number of R$^1$ groups are aromatic organic radicals and the balance thereof are aliphatic, alicyclic, or aromatic radicals. In one embodiment, each R$^1$ is an aromatic organic radical, for example a radical of the formula (2):

$$-A^1-Y^1-A^1- \quad (2)$$

wherein each of A$^1$ and A$^2$ is a monocyclic divalent aryl radical and Y$^1$ is a bridging radical having one or two atoms that separate A$^1$ from A$^2$. In an exemplary embodiment, one atom separates A$^1$ from A$^2$. Illustrative non-limiting examples of radicals of this type are —O—, —S—, —S(O)—, —S(O)$_2$—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical Y$^1$ may be a hydrocarbon group or a saturated hydrocarbon group such as methylene, cyclohexylidene, or isopropylidene.

Polycarbonates may be produced by the interfacial reaction of dihydroxy compounds having the formula HO—R$^1$—OH, which includes dihydroxy compounds of formula (3)

$$HO-A^1-Y^1-A^2-OH \quad (3)$$

wherein Y$^1$, A$^1$ and A$^2$ are as described above. Also included are bisphenol compounds of general formula (4):

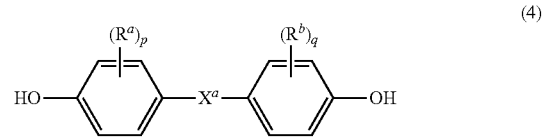

wherein R$^a$ and R$^b$ each represent a halogen atom or a monovalent hydrocarbon group and may be the same or different; p and q are each independently integers of 0 to 4; and X$^a$ represents one of the groups of formula (5):

wherein R$^c$ and R$^d$ each independently represent a hydrogen atom or a monovalent linear or cyclic hydrocarbon group and R$^e$ is a divalent hydrocarbon group.

Polycarbonate copolymers are also contemplated for use in the instant processes. A specific type of copolymer is a polyester carbonate, also known as a polyester-polycarbonate. Such copolymers further contain, in addition to recurring carbonate chain units of the formula (1), repeating units of formula (8):

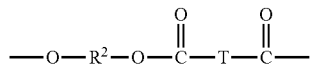
(8)

wherein $R^2$ is a divalent group derived from a dihydroxy compound, and may be, for example, a $C_{2-10}$ alkylene group, a $C_{6-20}$ alicyclic group, a $C_{6-20}$ aromatic group or a polyoxyalkylene group in which the alkylene groups contain 2 to about 6 carbon atoms, specifically 2, 3, or 4 carbon atoms; and T divalent group derived from a dicarboxylic acid, and may be, for example, a $C_{2-10}$ alkylene group, a $C_{6-20}$ alicyclic group, a $C_{6-20}$ alkyl aromatic group, or a $C_{6-20}$ aromatic group.

Examples of aromatic dicarboxylic acids that may be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is about 91:9 to about 2:98. In another specific embodiment, $R^2$ is a $C_{2-6}$ alkylene group and T is p-phenylene, m-phenylene, naphthalene, a divalent cycloaliphatic group, or a combination thereof. This class of polyester includes the poly(alkylene terephthalates).

Another type of polycarbonate copolymer is a polysiloxane-polycarbonate copolymer. The polysiloxane (also referred to herein as "polydiorganosiloxane") blocks of the copolymer comprise repeating siloxane units (also referred to herein as "diorganosiloxane units") of formula (10):

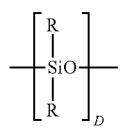
(10)

wherein each occurrence of R is same or different, and is a $C_{1-13}$ monovalent organic radical. For example, R may independently be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ arylalkyl group, $C_7$-$C_{13}$ arylalkoxy group, $C_7$-$C_{13}$ alkylaryl group, or $C_7$-$C_{13}$ alkylaryloxy group. The foregoing groups may be fully or partially halogenated with fluorine, chlorine, bromine, or iodine, or a combination thereof. Combinations of the foregoing R groups may be used in the same copolymer.

The value of D in formula (10) may vary widely depending on the type and relative amount of each component in the polymer, the desired properties of the polymer, and like considerations. Generally, D may have an average value of 2 to 1,000, specifically 2 to 500, and more specifically 5 to 100. The phrase "average value" is used to indicate that various siloxane blocks of siloxane units in the polycarbonate-polysiloxane copolymer may have different lengths.

In some embodiments, the siloxane unit may be derived from structural units of formula (11):

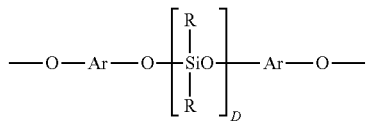
(11)

wherein D is as defined above; each R may independently be the same or different, and is as defined above; and each Ar may independently be the same or different, and is a substituted or unsubstituted $C_6$-$C_{30}$ arylene radical, wherein the bonds are directly connected to an aromatic moiety. Useful Ar groups in formula (11) may be derived from a $C_6$-$C_{30}$ dihydroxyarylene compound, for example a dihydroxyarylene compound of formula (3) or (4) above. Combinations comprising at least one of the foregoing dihydroxyarylene compounds may also be used. Specific examples of dihydroxyarylene compounds are 1,1-bis(4-hydroxyphenyl) methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl) propane, 1,1-bis(4-hydroxyphenyl) n-butane, 2,2-bis(4-hydroxy-1-methylphenyl)propane, 1,1-bis(4-hydroxyphenyl) cyclohexane, bis(4-hydroxyphenyl sulphide), and 1,1-bis(4-hydroxy-t-butylphenyl)propane. Combinations comprising at least one of the foregoing dihydroxy compounds may also be used.

Units of formula (11) may be derived from the corresponding dihydroxy compound of formula (12):

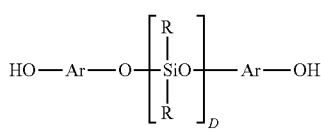
(12)

wherein R, Ar, and D are as described above. Compounds of formula (12) may be obtained by the reaction of a dihydroxyarylene compound with, for example, an alpha, omega-bisacetoxypolydiorganosiloxane under phase transfer conditions.

In other embodiments, the siloxane unit may be derived from structural units of formula (13):

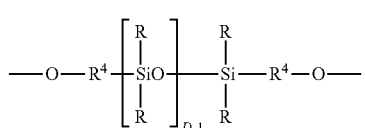
(13)

wherein R and D are as described above, and each occurrence of $R^4$ is independently a divalent $C_1$-$C_{30}$ alkylene, and wherein the polymerized polysiloxane unit is the reaction residue of its corresponding dihydroxy compound.

In other embodiments, the siloxane unit may be derived from structural units of formula (14):

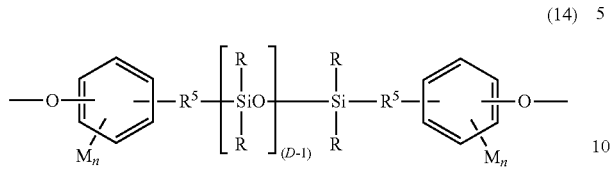
(14)

wherein R and D are as defined above. Each $R^5$ in formula (14) is independently a divalent $C_2$-$C_8$ aliphatic group. Each M in formula (14) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ arylalkyl, $C_7$-$C_{12}$ arylalkoxy, $C_7$-$C_{12}$ alkylaryl, or $C_7$-$C_{12}$ alkylaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^5$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, $R^5$ is a divalent $C_1$-$C_3$ aliphatic group, and R is methyl.

Units of formula (14) may be derived from the corresponding dihydroxy polydiorganosiloxane (15):

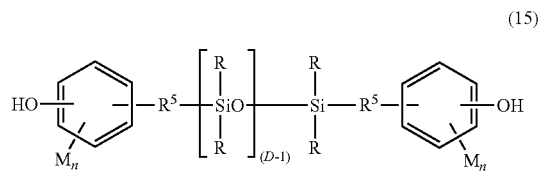
(15)

wherein R, D, M, $R^5$, and n are as described above. Such dihydroxy polysiloxanes can be made by effecting a platinum catalyzed addition between a siloxane hydride of formula (16):

(16)

wherein R and D are as previously defined, and an aliphatically unsaturated monohydric phenol. Useful aliphatically unsaturated monohydric phenols included, for example, eugenol, 2-allylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Mixtures comprising at least one of the foregoing may also be used.

The polycarbonate polymer used in the nanocomposite may be a polycarbonate homopolymer, a polyester-polycarbonate copolymer, or a polysiloxane-polycarbonate copolymer. In more specific embodiments, the polycarbonate polymer is a polycarbonate homopolymer.

In specific embodiments, the polycarbonate polymer is derived from a dihydroxy compound having the structure of Formula (I):

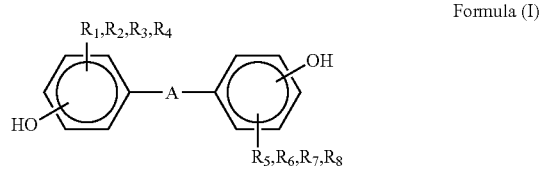
Formula (I)

wherein $R_1$ through $R_8$ are each independently selected from hydrogen, halogen, nitro, cyano, $C_1$-$C_{20}$ aliphatic, $C_1$-$C_{20}$ alkyl, $C_4$-$C_{20}$ cycloalkyl, and $C_6$-$C_{20}$ aryl; and A is selected from a bond, —O—, —S—, —SO$_2$—, $C_1$-$C_{12}$ alkyl, $C_6$-$C_{20}$ aromatic, $C_6$-$C_{20}$ cycloaliphatic, and $C_1$-$C_{20}$ aliphatic.

In specific embodiments, the dihydroxy compound of Formula (I) is 2,2-bis(4-hydroxyphenyl)propane (i.e. bisphenol-A or BPA). Other illustrative compounds of Formula (I) include:
2,2-bis(3-bromo-4-hydroxyphenyl)propane;
2,2-bis(4-hydroxy-3-methylphenyl)propane;
2,2-bis(4-hydroxy-3-isopropylphenyl)propane;
2,2-bis(3-t-butyl-4-hydroxyphenyl)propane;
2,2-bis(3-phenyl-4-hydroxyphenyl)propane;
2,2-bis(3,5-dichloro-4-hydroxyphenyl)propane;
1,1-bis(4-hydroxyphenyl)cyclohexane;
1,1-bis(3-chloro-4-hydroxyphenyl)-3,3,5-trimethylcyclohexane;
4,4'dihydroxy-1,1-biphenyl;
4,4'-dihydroxy-3,3'-dimethyl-1,1-biphenyl;
4,4'-dihydroxy-3,3'-dioctyl-1,1-biphenyl;
4,4'-dihydroxydiphenylether;
4,4'-dihydroxydiphenylthioether;
1,3-bis(2-(4-hydroxyphenyl)-2-propyl)benzene;
2,2-bis(4-hydroxy-3-isopropylphenyl)propane;
2,2-bis(3-t-butyl-4-hydroxyphenyl)propane;
2,2-bis(3-phenyl-4-hydroxyphenyl)propane;
2,2-bis(3,5-dichloro-4-hydroxyphenyl)propane;
1,1-bis(4-hydroxyphenyl)cyclohexane;
1,1-bis(3-chloro-4-hydroxyphenyl)-3,3,5-trimethylcyclohexane;
4,4'dihydroxy-1,1-biphenyl;
4,4'-dihydroxy-3,3'-dimethyl-1,1-biphenyl;
4,4'-dihydroxy-3,3'-dioctyl-1,1-biphenyl;
4,4'-dihydroxydiphenylether;
4,4'-dihydroxydiphenylthioether; and
1,3-bis(2-(4-hydroxyphenyl)-2-propyl)benzene.

The polycarbonate nanocomposite further comprises metal nanoparticles dispersed throughout the polycarbonate matrix. The metal is typically a noble metal, which is more stable in its reduced state and resistant to oxidation. In particular embodiments, the metal nanoparticles comprise a metal selected from the group consisting of cobalt, rhodium, iridium, copper, silver, gold, platinum, palladium, iron, nickel, manganese, samarium, neodymium, praseodymium, gadolinium, titanium, zirconium, silicon, indium, scandium, yttrium, lanthanum, cerium, promethium, europium, terbium, holmium, erbium, thulium, ytterbium, and lutetium. In more specific embodiments, the metal is selected from the group consisting of cobalt, rhodium, iridium, copper, silver, gold, platinum, palladium, iron, nickel, manganese, samarium, neodymium, praseodymium, gadolinium, titanium, zirconium, silicon, and indium. In further specific embodiments, the metal is selected from the group consisting of cobalt, rhodium, iridium, copper, silver, gold, platinum, and palladium.

The metal nanoparticles may have a particle size of from about 1 nanometer to about 500 nanometers. In more specific embodiments, they have a particle size of from about 3 to about 300 nanometers or from about 5 to about 250 nanometers. The size of the metal nanoparticles may be controlled by changing the reaction conditions for making the polycarbonate nanocomposite. In embodiments, the metal nanoparticles comprise 5 wt % or less of the polycarbonate nanocomposite, by weight of the polycarbonate nanocomposite. The metal nanoparticles can generally be any shape, including irregular, spherical, and cubic.

The metal nanoparticles are dispersed throughout the polycarbonate matrix. This dispersion can be measured in terms of the inter-particle distance ("IPD"). As used herein, the term "inter-particle distance" refers to an average value of the distance between the surfaces of any two nanoparticles dispersed in the polycarbonate matrix. As used herein, the term "agglomerates" means that the IPD of the nanoparticles in the polycarbonate matrix is less than 0.05 nm. In contrast, the IPD of the nanoparticles is from 0.05 nm to about 1500 nm.

To form the polycarbonate nanocomposite, a reaction mixture is formed, the reaction mixture comprising a dihydroxy compound, an activated carbonate, a metal precursor, and a solvent, wherein the metal precursor comprises a metal selected from the groups described above. The reaction mixture is then reacted, i.e. in-situ polymerized, to form the polycarbonate nanocomposite comprising a polycarbonate and metal nanoparticles.

As used herein, the term "activated carbonate" is defined as a diaryl carbonate which is more reactive than diphenyl carbonate toward transesterification reactions. Such activated carbonates have the structure of Formula (II):

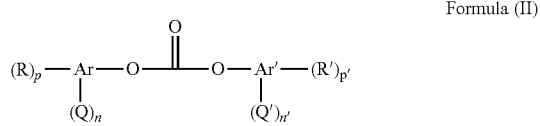

Formula (II)

wherein Q and Q' are independently activating groups; Ar and Ar' are independently aromatic rings; n and n' are independently whole numbers from zero up to the number of replaceable hydrogen groups substituted on the aromatic rings Ar and Ar', wherein (n+n')≥1; p and p' are integers; and R and R' are independently selected from alkyl, substituted alkyl, cycloalkyl, alkoxy, aryl, alkylaryl having from 1 to 30 carbon atoms, cyano, nitro, halogen, and carboalkoxy. The number of R groups, p, is an integer and can be zero up to the number of replaceable hydrogen groups on the aromatic ring Ar minus the number n. The number of R' groups, p', is an integer and can be zero up to the number of replaceable hydrogen groups on the aromatic ring Ar' minus the number n'. The number and type of the R and R' substituents on the aromatic rings Ar and Ar' are not limited unless they deactivate the carbonate and lead to a carbonate which is less reactive than diphenyl carbonate. Typically, the R and R' substituents are located in the para, ortho, or a combination of the two positions.

Non-limiting examples of activating groups Q and Q' are: alkoxycarbonyl groups, halogens, nitro groups, amide groups, sulfone groups, sulfoxide groups, imine groups, and cyano groups.

Specific and non-limiting examples of activated carbonates include:
bis(o-methoxycarbonylphenyl)carbonate;
bis(o-chlorophenyl)carbonate;
bis(o-nitrophenyl)carbonate;
bis(o-acetylphenyl)carbonate;
bis(o-phenylketonephenyl)carbonate;
bis(o-formylphenyl)carbonate; and
bis(o-cyanophenyl)carbonate.
Unsymmetrical combinations of these structures, where the substitution number and type on Ar and Ar' are different, may also be used.

A preferred structure for an activated carbonate is an ester-substituted diarylcarbonate having the structure of Formula (III):

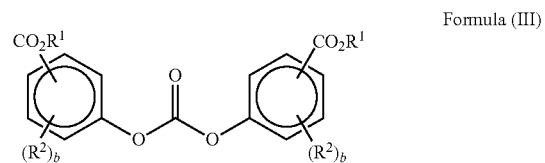

Formula (III)

wherein $R^1$ is independently a $C_1$-$C_{20}$ alkyl radical, $C_4$-$C_{20}$ cycloalkyl radical, or $C_4$-$C_{20}$ aromatic radical and $C_1$-$C_{20}$ aliphatic radical; $R^2$ is independently a halogen atom, cyano group, nitro group and $C_1$-$C_{20}$ aliphatic radical, $C_1$-$C_{20}$ alkyl radical, $C_4$-$C_{20}$ cycloalkyl radical, $C_4$-$C_{20}$ aromatic radical, $C_1$-$C_{20}$ alkoxy radical, $C_4$-$C_{20}$ cycloalkoxy radical, $C_4$-$C_{20}$ aryloxy radical, $C_1$-$C_{20}$ alkylthio radical, $C_4$-$C_{20}$ cycloalkylthio radical, $C_4$-$C_{20}$ arylthio radical, $C_1$-$C_{20}$ alkylsulfinyl radical, $C_4$-$C_{20}$ cycloalkylsulfinyl radical, $C_4$-$C_{20}$ arylsulfinyl radical, $C_1$-$C_{20}$ alkylsulfonyl radical, $C_4$-$C_{20}$ cycloalkylsulfonyl radical, $C_4$-$C_{20}$ arylsulfonyl radical, $C_1$-$C_{20}$ alkoxycarbonyl radical, $C_4$-$C_{20}$ cycloalkoxycarbonyl radical, $C_4$-$C_{20}$ aryloxycarbonyl radical, $C_2$-$C_{60}$ alkylamino radical, $C_6$-$C_{60}$ cycloalkylamino radical, $C_5$-$C_{60}$ arylamino radical, $C_1$-$C_{40}$ alkylaminocarbonyl radical, $C_4$-$C_{40}$ cycloalkylaminocarbonyl radical, $C_4$-$C_{40}$ arylaminocarbonyl radical, or $C_1$-$C_{20}$ acylamino radical; and b is independently at each occurrence an integer from zero to 4. Preferably, at least one of the substituents $CO_2R^1$ is attached in an ortho position relative to the carbonate group.

Examples of preferred ester-substituted diarylcarbonates include, but are not limited to, bis(methylsalicyl)carbonate (BMSC) (CAS Registry No. 82091-12-1), bis(ethyl salicyl) carbonate, bis(propyl salicyl)carbonate, bis(butylsalicyl)carbonate, bis(benzyl salicyl)carbonate, bis(methyl 4-chlorosalicyl)carbonate and the like. Typically bis(methylsalicyl) carbonate is preferred for use in melt polycarbonate synthesis due to its preparation from less expensive raw materials, lower molecular weight and higher vapor pressure.

One method for determining whether a certain diarylcarbonate is activated or is not activated is to carry out a model transesterification reaction between the certain diarylcarbonate with a phenol such as para-cumyl phenol. This phenol is preferred because it possesses only one reactive site, possesses a low volatility, and possesses a similar reactivity to bisphenol-A. The model transesterification reaction is carried out at temperatures above the melting points of the certain diarylcarbonate and para-cumyl phenol and in the presence of a transesterification catalyst, which is usually an aqueous solution of sodium hydroxide or sodium phenoxide. Preferred concentrations of the transesterification catalyst are about 0.001 mole % based on the number of moles of the phenol or diarylcarbonate. A preferred reaction temperature is 200° C. The choice of conditions and catalyst concentration can be adjusted depending on the reactivity of the reactants and melting points of the reactants to provide a convenient reaction rate. The only limitation to reaction temperature is that the temperature must be below the degradation temperature of the reactants. Sealed tubes can be used if the reaction temperatures cause the reactants to volatilize and affect the reactant molar balance. The determination of the equilibrium concentration of reactants is accomplished through reaction sampling during the course of the reaction and then analysis of the reaction mixture using a well-known detection method to those skilled in the art such as HPLC (high pressure liquid chromatography). Particular care needs to be taken so that reaction does not continue after the sample has been removed from the reaction vessel. This is accomplished by cooling down the sample in an ice bath and by employing a reaction quenching acid such as acetic acid in the water phase of the HPLC solvent system. It may also be desirable to introduce a reaction quenching acid directly into the reaction sample in addition to cooling the reaction mixture. A preferred concentration for the acetic acid in the water phase of the HPLC solvent system is 0.05% (v/v). The equilibrium constant can be determined from the concentration of the reactants and product when equilibrium is reached. Equilibrium is assumed to have been reached when the concentration of components in the reaction mixture reach a point of little or no change on sampling of the reaction mixture. The equilibrium constant can be determined from the concentration of the reactants and products at equilibrium by methods well known to those skilled in the art. A diarylcarbonate which possesses an equilibrium constant of greater than 1 is considered to possess a more favorable equilibrium than diphenyl carbonate and is an activated carbonate, whereas a diaryl carbonate which possesses an equilibrium constant of 1 or less is considered to possess the same or a less favorable equilibrium than diphenyl carbonate and is considered to be not activated. It is generally preferred to employ an activated carbonate with very high reactivity compared to diphenyl carbonate when conducting transesterification reactions. Preferred are activated carbonates with an equilibrium constant at least 10 times greater than that of diphenyl carbonate. Use of an activated carbonate allows polymerization in a shorter time and at lower temperatures.

Some non-limiting examples of non-activating groups which, when present in an ortho position relative to the carbonate group, would not be expected to result in activated carbonates are alkyl and cycloalkyl. Some specific and non-limiting examples of non-activated carbonates are bis(o-methylphenyl)carbonate, bis(p-cumylphenyl)carbonate, and bis(p-(1,1,3,3-tetramethyl)butylphenyl)carbonate.
Unsymmetrical combinations of these structures are also expected to result in non-activated carbonates.

The mole ratio of activated carbonate to dihydroxy compound is generally 1 or greater. Usually, the mole ratio is slightly greater than 1, such as about 1.01 to about 1.03, to facilitate controlling the polymerization of the polycarbonate.

The metal precursor provides the metal atoms from which the metal nanoparticles are formed. The metal precursor contains the metal in an oxidized state, whereas the metal is at oxidation state 0 in the nanocomposite. The various metals from which nanoparticles can be formed are listed above. For metals such as gold (Au), platinum (Pt), palladium (Pd), copper (Cu), silver (Ag), cobalt (Co), iron (Fe), nickel (Ni), manganese (Mn), samarium (Sm), neodymium (Nd), praseodymium (Pr), gadolinium (Gd), titanium (Ti), zirconium (Zr), silicon (Si), and indium (In), the metal precursor may be an alloy, such as a binary or ternary alloy, containing the metal, or an oxide of the metal. Exemplary silver precursors include silver trifluoromethanesulfonate ($AgCF_3SO_3$), silver tetrafluoroborate ($AgBF_4$), silver nitrate ($AgNO_3$), silver perchlorate ($AgClO_4$), silver acetate, silver hexanoate, and silver (diacetyl diacetonate). Exemplary cobalt precursors include $Co_2(CO)_8$, $CoCl_2$, and $CoNO_3$. Exemplary iron precursors include $Fe(NO_3)_2$, $Fe(acetate)_2$, and $FeCl_2$. For rare earth elements such as scandium, yttrium, lanthanum, cerium, praseodymium, neodymium, promethium, europium, samarium, gadolinium, terbium, dysprosium, holmium, erbium, thulium, ytterbium, and lutetium, exemplary metal precursors may be a metal acetate, metal ethanoate, metal carboxylate, metal alkoxide, metal octanoate, metal hexanoate, metal chelate, metal halide, metal nitrate, metal sulfate, or a metal hydroxide. In specific embodiments, the metal precursor is a metal salt. The metal precursor should be soluble in organic solvents, as water is typically not used in these processes.

The solvent is an organic solvent, particularly a polar solvent. Suitable solvents that can be employed include aliphatic alcohols having 1 to 4 carbon atoms, aliphatic ketones having 4 to 10 carbon atoms, chlorinated solvents having 1 to 6 carbon atoms, or aromatic solvents having 6 to 20 carbon atoms, or chemically reducing solvents such as N,N-dimethylformamide (DMF), benzyl alcohol, dimethyl sulfoxide (DMSO), N-ethyl pyrrolidone, or N-methyl pyrrolidone (NMP). Specific non-limiting examples of solvents include, methanol, isopropanol, butanol, n-propanol, n-pentanol, 2-methoxypropanol, ethanol, isobutanol, tert-butanol, tert-pentanol, isopentanol, methyl isobutyl ketone, methyl propyl ketone, diethyl ketone, propyl methyl ketone, toluene, xylene, methyl salicylate, monochlorobenzene, dichlorobenzene, chloroform, carbon tetrachloride, dichloroethane, dichloromethane, 2,4-dimethylpentane, 1,4-dioxane, p-dioxane, dodecafluoro-1-hepatanol, ethanol, ethyl acetate, ethyl ether, ethyl formate, ethyl propionate, ethylene dichloride, formamide, heptane, 2-hexanone, i-butyl acetate, i-butyl alcohol, i-butyl formate, i-butylamine, i-octane, isopropyl acetate, i-propyl ether, methanol, 2-methoxyethanol, methyl acetate, methyl ethyl ketone (MEK), methyl n-butyrate, 1-methyl-2-propanol, 2-methyl-3butanone, 2-methyl-4-pentanone, 2-methyl-2-propanol, methylene chloride, 2-methylhexane, 3-methylhexane, 3-methylpentane, 2-methylpentane, 3-n-decane, n-hexane, nitrobenzene, nitroethane, nitromethane, 2-nitropropane, 1-octafluoropentanol, octane, 2-pentanone, 3-pentanone, 1-propanol, 2-propanol, propionaldehyde, propionic acid, propionitrile, propyl ether, propyl formate, propylamine, propyl acetate, pyridine, t-butyl methyl ether, tetrahydrofuran, toluene, triethylamine, trifluoroacetic acid, trifluoroethanol, trifluoropropanol, trimethylbutane, 2,2,3-trimethylhexane, 2,2,5-trimethylpentane, 2,2,4-valeronitrile, water, p-xylene, heptane, acetic anhydride, acetone, acetonitrile, benzene, benzonitrile, benzyl ether, 1-butanol, 2-butanol, 2-butanone, butyl acetate, sec-butyl acetate, butyl ether, butyl ethyl ether, butyl formate, 2-butylamine, butyraldehyde, butyric acid, butyronitrile, 2-chlorobutane, 1-chloropropane, 2-chloropropane, cyclohexane, diethyl carbonate, di-isopropylamine, 2,2-dimethylbutane, 2,3-dimethylbutane, and 2,3-dimethylpentane.

In further embodiments, the boiling point of the solvent is equal to or greater than the melting point of the activated carbonate.

If desired, the polycarbonate nanocomposite may further comprise a stabilizer. In embodiments, the stabilizer is selected from the group consisting of nano-sized fillers, polymeric coordinating stabilizers, and solvents that have a coordinating group. The term "coordinating" refers to a functional group or stabilizer that enables charge-transfer complex formation or which chelates with the metal precursor or metal nanoparticle at a stage in the reaction. Exemplary nano-sized fillers include nanosilica, nanoalumina, aluminosilicates (with or without stabilizers), nanozirconia, any other metal oxide having an isotropic or anisotropic shape, montmorillonite (with or without organic modifiers), mica, and other metal silicates available in spherical, platelet, and/or particulate shapes. Exemplary polymeric coordinating stabilizers can generally have any structure, such as linear, nonlinear, dendrimer, or hyperbranched polymer structures. The polymeric coordinating stabilizer will generally have polar functional groups in the main chain backbone or a pendant group. Exemplary polar groups include anhydride groups, hydroxyl groups, cyanonitrile groups, carbon-carbon double bonds, amine groups, acetamide groups, ether groups, acid groups, esters, epoxy, pyrrolidone, morpholine, oxazoline, sulfonate, thioester, and carbonate. Exemplary polymeric coordinating stabilizers include ionomeric polymers, polyethylene glycol, poly(2-ethyl-2-oxazoline), polyvinylpyrrolidone, polymethyl methacrylates, styrene acrylonitrile, styrene acrylic acid, and styrene GMA copolymers. In other embodiments, the stabilizer is an organo-titanate or organozirconate. In other embodiments, the stabilizer is an organosilane or organosiloxane. Exemplary organosiloxanes include oligomeric linear or cyclic siloxanes such as octamethyltetrasiloxane or hexamethyltrisiloxane. Exemplary organosilanes include organoalkyoxysilanes such as phenyltrimethoxysilane, diphenyldimethoxysilane, polyethyleneglycoltrimethoxysilane, phenethyltrimethoxysilane, gamma-methacryloxypropyltrimethoxysilane, gamma-aminopropyltrimethoxysilane, glycidyloxypropyltrimethoxysilane, N-aminoethyl-3-aminopropyltrimethoxysilane, aminoethylaminopropylmethyldimethoxysilane, aminoethylaminopropyltrimethoxysilane, methyltrimethoxysilane, methyltriethoxysilane, mercaptopropyltrimethoxysilane, mercaptopropylmethyldimethoxysilane, chloropropyltrimethoxysilane, chloropropyltriethoxysilane, chloropropylmethyldimethoxysilane, phenyltriethoxysilane, diphenyldiethoxysilane, polyethyleneglycoltriethoxysilane, phenyltriethoxysilane, gamma-methacryloxypropyltriethoxysilane, gamma-aminopropyltriethoxysilane, glycidyloxypropyltriethoxysilane, and N-aminoethyl-3-aminopropyltriethoxysilane. The stabilizer can be added to the reaction mixture prior to or during the reaction of the reaction mixture.

If desired, the reaction mixture may further comprise a catalyst. The catalyst may be a one-component or multi-component catalyst, such as a catalyst system. In specific embodiments, the catalyst is a system comprising an alkali metal hydroxide (alpha catalyst) and a tetraalkyl ammonium or tetraalkyl phosphonium salt (beta catalyst). In more specific embodiments, the catalyst comprises a system of tetramethyl ammonium hydroxide (TMAH) and sodium hydroxide (NaOH). The total amount of alpha catalyst employed is typically about $1 \times 10^{-7}$ to about $1 \times 10^{-4}$ moles, more specifically about $1 \times 10^{-6}$ to about $1 \times 10^{-4}$ moles, or even more specifically about $1 \times 10^{-5}$ to about $1 \times 10^{-4}$ moles of catalyst per mole of the dihydroxy compound. The total amount of beta catalyst employed is typically about $1 \times 10^{-5}$ to about $1 \times 10^{-2}$ moles, more specifically about $1 \times 10^{-4}$ to about $1 \times 10^{-2}$ moles of catalyst per mole of the dihydroxy compound.

The reaction mixture may be reacted by heating the reaction mixture. In embodiments, the reaction mixture is heated once, twice, thrice, or more. The heatings take place in an inert atmosphere, which generally lacks the presence of oxygen. For example, an inert atmosphere may be provided by the use of nitrogen gas or argon gas. The inert atmosphere also helps retain the nanoparticles in a metallic, i.e. non-oxidized, state. No exposure to light, such as ultraviolet light, is needed to induce polymerization or to cure the nanocomposite.

In one embodiment, the reaction mixture is first heated at a temperature of about 50° C. for a first period of time, then heated at a temperature of about 120° C. for a second period of time. As an example, these heatings are suitable for formation of cobalt nanoparticles from $Co_2(CO)_8$ in toluene.

In other embodiments, the reaction mixture is reacted through a series of changes in temperature and pressure. In some embodiments, the reaction mixture is heated a first time, generally from room temperature (~25° C.), to a first temperature of from about 50° C. to about 230° C., then held at that temperature for a first period of time. In some more specific embodiments, the first temperature is from about 150° C. to about 230° C. The first period of time may be from about 15 minutes to about 60 minutes. The pressure during this first period of time may be maintained at a first pressure of from about 800 millibar to about 1100 millibar. In specific embodiments, the first pressure is about 910 millibar (1 atm=~1.013 bar). In some specific embodiments, the initial reaction mixture is reacted for about 20 minutes at about 180° C. at about 910 millibar (1 atm=~1.013 bar). For example, formation of cobalt nanoparticles from $Co_2(CO)_8$ in DMF, DMSO, or NMP requires only a single heating step.

In other embodiments, the reaction mixture may then be heated to a second temperature of from about 210° C. to about 250° C., then held at that temperature for a second period of time. The second temperature may be equal to or higher than the first temperature. The second period of time may be from about 5 minutes to about 65 minutes. The pressure during this second period of time is decreased from the first pressure and may be maintained at a second pressure of from about 50 millibar to about 220 millibar. The change from the first pressure to the second pressure can occur over a period of from about 3 to about 7 minutes at a rate of from about 70 to about 105 millibar per 30 seconds. This decrease in pressure allows removal of byproducts, such as methyl salicylic acid, formed during the formation of the polycarbonate. In some specific embodiments, the second heating is for about 10 minutes at about 220° C. at about 100 millibar.

In additional embodiments, the reaction mixture may then be heated to a third temperature of from about 270° C. to about 310° C., then held at that temperature for a third period of time. The third temperature is higher than the second temperature. The third period of time may be from about 5 minutes to about 35 minutes. The pressure during this third period of time is reduced from the second pressure to as close to zero as possible, including less than about 30 millibar. In some specific embodiments, the third heating is for about 10 minutes at about 280° C. at close to zero millibar.

A polycarbonate nanocomposite comprising a polycarbonate and metal nanoparticles is produced from the reaction of the reaction mixture. In embodiments, the polycarbonate has a weight average molecular weight of from about 20,000 to about 200,000 relative to polystyrene standards. In more specific embodiments, the polycarbonate has a weight average molecular weight of from about 25,000 to about 150,000 or from about 30,000 to about 150,000.

In the processes of the present disclosure, the metal nanoparticles are formed in-situ from the mixture of the metal precursor and monomer. Put another way, the polycarbonate is not merely formed around metal nanoparticles which are initially provided. Without being bound by theory, the gradual increase in molecular weight of the polymer throughout the polymerization process appears to stabilize the nanoparticles, which are generated from the metal precursor by the high temperatures of the melt blending process. This stabilization also keeps the nanoparticles well dispersed in the resulting polycarbonate matrix. It is also possible that electron negative atoms in the matrix provide a nanodomain or nanoreactor where the metal nanoparticle can form, thereby acting as a stabilizer. Because the nanoparticles are encapsulated by the polycarbonate matrix, they do not oxidize when the nanocomposite is exposed to atmosphere.

It is believed that the byproducts formed during reduction of the metal precursor in the solvent play a critical role in the increase in molecular weight of the polycarbonate matrix. For example, on reduction of silver nitrate $AgNO_3$, the silver is reduced from $Ag(+1)$ to $Ag(0)$ and the nitrate ion is reduced to $NO_2$ and $O_2$. A solvent such as DMF converts to dimethylamine and $CO_2$. DMSO forms dimethyl sulfide and oxygen. Here, some of the byproducts are volatile gaseous products, so that they are removed and do not hinder further polymerization. The other byproducts are inert and do not hinder the molecular weight increase of the polycarbonate. In addition, the presence of solvent maintains good dispersion of the nanoparticles formed during the early stages of polymerization, when viscosity is low. Once a sufficient viscosity it reached, the viscosity maintains the dispersion of the nanoparticles as the solvent evaporates, boils off, or degrades. When a solvent is not used, particle sizes are in the range of 150 to 1000 nanometers; this also leads to agglomeration.

The resulting polycarbonate nanocomposites have several advantages. Dispersion of the nanoparticles in the polycarbonate matrix is good. The polycarbonate nanocomposite has better transparency. At low loadings of the nanoparticles in the polycarbonate, the polycarbonate nanocomposite has good infrared reflectance, high/low index of refraction depending on the type of nanoparticle, antimicrobial properties, UV absorption, is magnetic, and/or is antistatic.

The polycarbonate nanocomposite may further comprise one or more additives. The additive(s) may be present in quantities of up to about 20% by weight, and more preferably in quantities of from 0.00001 to about 15% by weight, based on the weight of the nanocomposite comprising the additive(s). These additives include such materials as thermal stabilizers, antioxidants, UV stabilizers, plasticizers, visual effect enhancers, extenders, antistatic agents, catalyst quenchers, mold releasing agents, fire retardants, blowing agents, impact modifiers, processing aids, other oligomeric species, and other polymeric species. The different additives that can be incorporated into the polycarbonate nanocomposites are typically those that are commonly used in resin compounding and are known to those skilled in the art.

The polycarbonate nanocomposites of the present disclosure may be formed into articles by conventional plastic processing techniques. Molded articles may be made by compression molding, blow molding, injection molding or such molding techniques known to those skilled in the art. Nanocomposites comprising silver nanoparticles might be useful as plastic storage containers, food packaging materials, glazing, sheets, clothes, and ballistic protection materials (e.g. bulletproof vests). They could also be useful in IR reflective coatings, optical data storage applications, biological labels, electroluminescent displays, antibacterial/antiviral applications, and biodetection applications. Nanocomposites comprising cobalt nanoparticles might be useful in magnetic recording, medical sensors, electronic packaging, IR reflective coatings, scratch resistant coatings, tool coatings, and barrier applications.

The following examples are provided to illustrate the polycarbonate nanocomposites, articles, and methods of the present disclosure. The examples are merely illustrative and are not intended to limit the disclosure to the materials, conditions, or process parameters set forth therein.

EXAMPLES

Procedures

Several polycarbonate nanocomposites were made, as described herein. Some were characterized via Transmission Electron Microscopy (TEM), Wide angle X-Ray Diffraction (WAXD), Ellipsometry, and/or Gel Permeation Chromatography (GPC).

Transmission Electron Microscopy (TEM)

Microscopy studies were performed on a Tecnai G2 TEM. Samples for TEM were prepared by cutting, blocking and facing of samples on a Leica UCT ultramicrotome. Final microtome of 100 nm sections was performed at room temperature on the Leica UCT. No staining was needed. TEM micrographs were made on representative areas at an accelerating voltage of 120 kV.

Wide Angle X-Ray Diffraction (WAXD)

Diffraction studies were done on XPERT PRO XRD with graphite monochromatized Cu—K alpha radiation. Molded samples were directly placed on a flat sample stage and brittle samples were powdered fine and loaded into a sample cell and placed on a flat sample stage. The scan was done from a $2\theta$ (diffraction angle) of 3° to 70° at room temperature. The grain size t was calculated using the Debye-Scherer formula, $$t=0.89\lambda/(\beta \cos \theta_B)$$

where $\lambda$ is the x-ray wavelength ~1.5406 Å, $\theta_B$ is the Bragg diffraction angle, and $\beta$ is the peak width at half maximum.

Ellipsometry

IR Reflectivity was done on a SENTECH 850 Spectroscopic Ellipsometer. The samples were spin coated on silicon wafers. The measurement was done at 70° from 350-1700 nm with a measuring spot size of 1 mm at room temperature.

Fifteen (15) example compositions E1-E15 and six comparative compositions CE1-CE6 were made. Below, the procedures for making E1, E2, E9, CE2, and CE5 are described. A table is then provided showing the other compositions and results.

Example 1

In Example 1, a polycarbonate nanocomposite was formed from bisphenol-A, silver nitrate, N,N-dimethyl formamide (DMF), methyl ethyl ketone (MEK), and silica nanoparticles.

In a round bottom flask 0.5 grams of silver nitrate salt was dissolved in 5 grams of DMF. To this solution, 1 gram of MEK solution containing 0.3 grams of silica was added and mechanically stirred (600-900 rpm) at room temperature for 10 minutes.

Separately, to a reactant mixture of bisphenol-A and BMSC having a mole ratio of BMSC:BPA=1.01, 400 microliters of a solution containing TMAH (2.6 milligrams (mg)) and NaOH (9.58 mg) were added as a catalyst, and the resultant mixture was purged with nitrogen and heated to a temperature of 180° C. under stirring at a speed of 90 rpm. After 15 minutes at 180° C. and at 910 millibar pressure inside the tube reactor, the temperature was increased to 220° C. The pressure was slowly reduced from 910 millibar to 100 millibar over a period of 4 to 5 minutes at a rate of 75 to 100 millibar per 30 seconds. After being maintained at 100 millibar and 220° C. for 10 minutes, the reaction was stopped to form a resultant mixture of 30 grams of solid powder of low molecular weight polycarbonate.

The silver nitrate/DMF/MEK/silica solution was then added to the glass tube reactor containing 30 grams of solid powder of low molecular weight bisphenol-A polycarbonate. The reactant mixture was heated to 220° C. and maintained for 20 minutes with a pressure of 910 millibar in the tube reactor. This was followed by slowly reducing pressure from 910 millibar to 100 millibar over a period of 4 to 5 minutes at a rate of 75 to 100 millibar per 30 seconds. After being maintained at 100 millibar and 220° C. for 10 minutes, the temperature was increased to 280° C. The reaction mixture was then maintained at 280° C. and 0 millibar for 10 minutes to provide a bisphenol-A polycarbonate nanocomposite comprising 1.50 wt % silver nanoparticles.

As used in the Examples, "low molecular weight" refers to a molecular weight of about 8,000 to about 12,000, measured according to polystyrene standards. The term "high molecular weight" refers to a molecular weight of about 20,000 to about 200,000, measured according to polystyrene standards.

Example 2

In Example 2, a polycarbonate nanocomposite was formed from bisphenol-A oligomer, bisphenol-A, BMSC, silver nitrate, methyl salicylate, DMF, and organically modified nanoclay.

Bisphenol-A oligomer was prepared from a reactant mixture of bisphenol-A and BMSC at mole ratio of BMSC: BPA=1.01, 400 microliters of a solution containing TMAH (2.6 mg) and NaOH (9.58 mg) were added as a catalyst, and the resultant mixture was purged with nitrogen and heated to a temperature of 180° C. under stirring at a speed of 90 rpm. After 15 minutes at 180° C. and at 910 millibar pressure inside the tube reactor, the temperature was increased to 220° C. The pressure was slowly reduced from 910 millibar to 100 millibar over a period of 4 to 5 minutes at a rate of 75 to 100 millibar per 30 seconds. After being maintained at 100 millibar and 220° C. for 10 minutes, the reaction was stopped to form a bisphenol-A oligomer having low molecular weight. The bisphenol-A oligomer served as a stabilizer in the following reactions.

Separately, in a round bottom flask, 0.6 grams of organically modified nanoclay was dispersed in 30 grams of methyl salicylate and 3 grams of the bisphenol-A oligomer and mechanically stirred (500-700 rpm) at 150° C. for 3 hours. The resultant dispersion was cooled to room temperature. To this a solution of 0.5 grams of silver nitrate salt and DMF (5 grams) was added and mechanically stirred for 20 minutes.

The resultant solution was then added to a glass tube reactor containing bisphenol-A (24 g) and BMSC (35.78 g) to form a reactant mixture. 400 microliters of a solution containing TMAH (2.6 mg) and NaOH (9.58 mg) were added as a catalyst to the reactant mixture and the resultant mixture was purged with nitrogen and heated to a temperature of 180° C. under stirring at a speed of 90 rpm. After 20 minutes at 180° C. and at 910 millibar pressure inside the tube reactor, the temperature was increased to 220° C. The pressure was slowly reduced from 910 millibar to 100 millibar over a period of 4 to 5 minutes at a rate of 75 to 100 millibar per 30 seconds. After being maintained at 100 millibar and 220° C. for 10 minutes, the temperature was increased to 280° C. The reaction mixture was then maintained at 280° C. and 0 millibar for 10 minutes to provide a bisphenol-A polycarbonate nanocomposite comprising 1.20 wt % silver nanoparticles Examples 3-8

Examples E3-E8 were formed using methods similar to those described in Examples 1 and 2, but with variations in the solvent and stabilizer.

Example 9

In Example 9, a polycarbonate nanocomposite was formed from bisphenol-A, dicobalt octacarbonyl, toluene and polyethylene glycol trimethoxysilane.

In a round bottom flask 0.9 grams of dicobalt octacarbonyl salt was dissolved in 30 grams of toluene. To this solution, treated nanosilica in methyl ethyl ketone (0.9 grams, containing 15 weight percent of nanosilica; the nanosilica was treated with methacryloxy propyl trimethoxy silane in presence of triethyl amine at 80° C. was added and mechanically stirred (600-900 rpm) at room temperature for 10 minutes. The resultant solution was then added to a glass tube reactor containing bisphenol-A (24 g) and BMSC (35.78 g) to form a reactant mixture. 400 microliters of a solution containing TMAH (2.6 mg) and NaOH (9.58 mg) were added as a catalyst to the reactant mixture and the resultant mixture was purged with nitrogen and heated to a temperature of 50° C. under stirring at a speed of 90 rpm for 20 minutes. The temperature was then maintained at 120° C. for 20 minutes at 910 millibar in nitrogen gas and stirring at 90 rpm. After 20 minutes the temperature was increased to 180° C. inside the tube reactor and maintained for 15 minutes. The temperature was then increased to 220° C. The pressure was slowly reduced from 910 millibar to 100 millibar over a period of 4 to 5 minutes at a rate of 75 to 100 millibar per 30 seconds. After being maintained at 100 millibar and 220° C. for 10 minutes, the temperature was increased to 280° C. The reaction mixture was then maintained at 280° C. and 0 millibar for 10 minutes to provide a bisphenol-A polycarbonate nanocomposite comprising 1.2 wt % cobalt nanoparticles.

Example 10-15

Examples E10-E15 were formed using methods similar to those described in Example 9, but with variations in the solvent and stabilizer.

Comparative Example 1

Comparative Example 1 was a polycarbonate polymer which contained no metal nanoparticles.

Comparative Example 2

In Comparative Example 2, a polycarbonate nanocomposite was formed from bisphenol-A, diphenyl carbonate (DPC), silver nitrate, and methanol.

In a round bottom flask 0.15 grams of silver nitrate was dissolved in 15 grams of methanol. The solution was added to a glass tube reactor containing bisphenol-A (24 g) and DPC (23.35 grams). 800 microliters of a solution containing TMAH (2.6 mg) and NaOH (9.58 mg) were added as a catalyst to the reactant mixture and the resultant mixture was purged with nitrogen and heated to a temperature of 180° C. under stirring at a speed of 90 rpm. After 15 minutes the pressure in the tube reactor reached 910 millibar. After 30 minutes, the temperature was increased to 220° C., and the pressure was maintained at 910 millibar for 30 minutes. The temperature was then increased to 240° C. The pressure was slowly reduced from 910 millibar to 170 millibar over a period of 4 to 5 minutes at a rate of 75 to 100 millibar per 30 seconds. After being maintained at 170 millibar and 240° C. for 60 minutes, the temperature was increased to 280° C. The reaction mixture was then maintained at 280° C. and 20 millibar for 30 minutes and finally maintained at 300° C., 0 millibar pressure for 30 minutes to provide a bisphenol-A polycarbonate nanocomposite comprising 0.40 wt % silver nanoparticles.

The caramel brown polymer was of very high viscosity and whatever little was collected could not be dissolved in dichloromethane or DMF. A swollen gel was obtained in solvents after some time, implying the polymer was cross-linked, which was not a desired result.

Comparative Examples 3 and 4

Comparative Examples 3 and 4 were prepared using procedures similar to Example 9, but using DPC instead of an activated carbonate.

Comparative Example 5

In Comparative Example 5, a polycarbonate nanocomposite was formed from bisphenol-A, zinc acetate, DMF, methanol and PVP.

To a reactant mixture of bisphenol-A and BMSC having a mole ratio of BMSC:BPA=1.01, 400 microliters of a solution containing TMAH (2.6 mg) and NaOH (9.58 mg) were added as a catalyst, and the resultant mixture was purged with nitrogen and heated to a temperature of 180° C. under stirring at a speed of 90 rpm. After 15 minutes at 180° C. and at 910 millibar pressure inside the tube reactor, the temperature was increased to 220° C. The pressure was slowly reduced from 910 millibar to 100 millibar over a period of 4 to 5 minutes at a rate of 75 to 100 millibar per 30 seconds. After being maintained at 100 millibar and 220° C. for 10 minutes, the reaction was stopped to form a solid powder of low molecular weight polycarbonate.

Separately, in a round bottom flask 0.2 grams of zinc acetate salt was dissolved in 5 grams of DMF. To this solution, a solution of 2 grams of PVP in 20 grams of methanol was added and mechanically stirred (600-900 rpm) at room temperature for 15 minutes. The resultant solution was then added to a glass tube reactor containing 50 grams of solid powder of low molecular weight bisphenol-A polycarbonate. The reactant mixture was heated to 220° C. and maintained for 20 minutes at a pressure of 910 millibar in the tube reactor. This was followed by slowly reducing the pressure from 910 millibar to 100 millibar over a period of 4 to 5 minutes at a rate of 75 to 100 millibar per 30 seconds. After being maintained at 100 millibar and 220° C. for 10 minutes, the temperature was increased to 280° C. The reaction mixture was then maintained at 280° C. and 0 millibar for 10 minutes to provide a bisphenol-A polycarbonate nanocomposite comprising zinc oxide nanoparticles.

Figure 5:
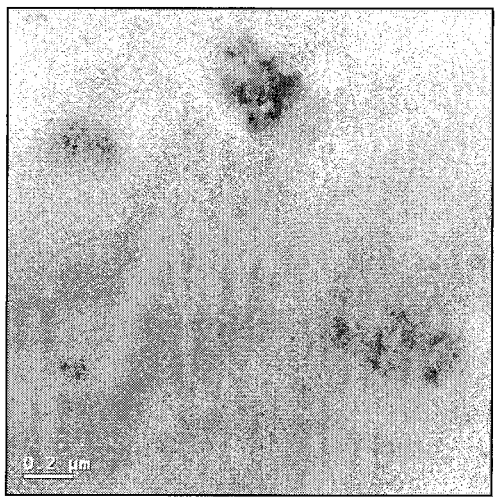
FIG. 5 is a TEM micrograph showing the morphology of a second comparative nanocomposite comprising zinc oxide nanoparticles.

FIG. 5 is a TEM micrograph of the nanocomposite.

Comparative Example 6

Comparative Example 6 was prepared using procedures similar to Comparative Example 5, but using DPC instead of the activated carbonate BMSC.

Examples E1-E15 and CE1-CE6

Table 1 shows the various parameters for each composition. Table 2 shows the results for each composition.

The activated carbonate used was BMSC in all Examples except for CE2, CE3, CE4, and CE6, where DPC (not an activated carbonate) was used. PVP was polyvinylpyrrolidone, having either a Mw of 45,000 or 360,000. Diallyl BPA was a polycarbonate copolymer containing 5 mol % diallyl groups. The stabilizer was either added to the initial mixture (prior to heating) or after the reaction mixture had been heated to 220° C. The weight average molecular weight (Mw) of the nanocomposite was measured relative to polystyrene standards. "NT" means "not tested." The angular IR reflectance was the reflectance measured at a 60° angle. The metal loading referred to the final metal nanoparticle level in the nanocomposite, not the wt % of the precursors. Note that CE1 did not contain metal nanoparticles at all.

TABLE 1

| | Reaction Mixture Components | | | |
| --- | --- | --- | --- | --- |
| Example | Activated Carbonate | Metal Precursor | Solvent | Stabilizer |
| E1 | Yes | $AgNO_3$ | DMF | MEK-ST NanoSilica |
| E2 | Yes | $AgNO_3$ | DMF | Cloisite 10A |
| E3 | Yes | $AgNO_3$ | DMF | PVP(45K Mw) |
| E4 | Yes | $AgNO_3$ | DMF | PVP(360K Mw) |
| E5 | Yes | $AgNO_3$ | DMF/MeO-IPA(1:2) | Treated MEK-ST NanoSilica |
| E6 | Yes | $AgNO_3$ | DMF | none |
| E7 | Yes | $AgNO_3$ | DMSO | none |
| E8 | Yes | $AgNO_3$ | NMP | none |
| E9 | Yes | $Co_2(CO)_8$ | Toluene | Treated MEK-ST NanoSilica |
| E10 | Yes | $Co_2(CO)_8$ | Toluene | Diallyl BPA |
| E11 | Yes | $Co_2(CO)_8$ | Toluene | Diallyl BPA |
| E12 | Yes | $Co_2(CO)_8$ | DMF | none |
| E13 | Yes | $Co_2(CO)_8$ | DMF | PVP(360K Mw) |
| E14 | Yes | $Co_2(CO)_8$ | NMP | none |
| E15 | Yes | $Co_2(CO)_8$ | DMSO | none |
| CE1 | Yes | none | none | none |
| CE2 | No | $AgNO_3$ | DMF | none |
| CE3 | No | $Co_2(CO)_8$ | Toluene | none |
| CE4 | No | $Co_2(CO)_8$ | DMF | none |
| CE5 | Yes | $Zn(CH_3COO)_2$ | DMF | PVP(45K Mw) |
| CE6 | No | $Zn(CH_3COO)_2$ | MeOH | NA |

TABLE 2

PC Nanocomposite Properties

| Example | Mw | Appearance | Metal loading (wt. %) | Metal Oxidation state (XRD) | Metal nanoparticle shape/size | Angular IR reflectance (%) |
|---|---|---|---|---|---|---|
| E1 | 63k | Green Opaque | 1.5 | 0 | Spherical 75-125 | 26 |
| E2 | 75k | Green Translucent | 1.2 | 0 | Spherical 20-70 | 35 |
| E3 | 50k | Green Opaque | 2.0 | 0 | Spherical 20-40 | 33 |
| E4 | 80k | Brown Transparent | 1.0 | 0 | Spherical | NT |
| E5 | 57k | Brown Opaque | 0.5 | 0 | Irregular 50-200 | NT |
| E6 | 140k | Green Opaque | 1.0 | 0 | Irregular 25-80 | 26 |
| E7 | 130k | Brown Transparent | 1.0 | 0 | Spherical 5-50 | 35 |
| E8 | 65k | Green Opaque | 1.0 | 0 | Spherical 25-50 | NT |
| E9 | 34.5k | Green Transparent | 1.2 | 0 | Spherical 30-100 | NT |
| E10 | 45k | Brown Transparent | 0.1 | 0 | Irregular 5-100 | NT |
| E11 | 39k | Brown Transparent | 1.0 | 0 | Irregular 5-100 | 30 |
| E12 | 38k | Black Transparent | 1.0 | 0 | Cubic 25-50 | 33 |
| E13 | 39k | Black Transparent | 1.0 | 0 | Cubic 25-100 | NT |
| E14 | 12K | Green Transparent | 1.0 | 0 | Cubes 25-100 | NT |
| E15 | 24K | Green Transparent | 1.0 | 0 | Spherical 30-100 | NT |
| CE1 | 50k | Transparent | 0.0 | NA | NA | 12 |
| CE2 | cross-linked | Brown Opaque | 0.4 | 0 | Irregular 200-1000 | NT |
| CE3 | 5k | Pink Transparent | 1.0 | +3 | Nt | NT |
| CE4 | 25k | Pink Transparent | 1.0 | +3 | Irregular 100-200 | NT |
| CE5 | 5k-10k | Yellow Transparent | 0.25 | +2 | Irregular 100-500 nm | NT |
| CE6 | 5k-10k | Brown Transparent | 1 | +2 | Nt | NT |

Figure 2:
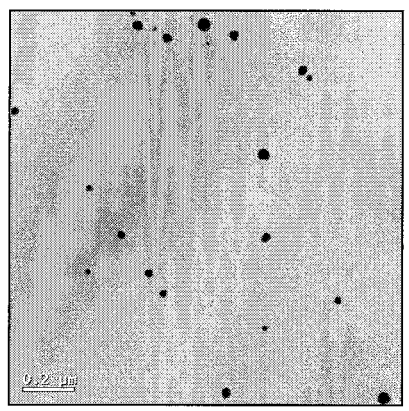
FIG. 2 is a TEM micrograph showing the morphology of a second exemplary nanocomposite comprising silver nanoparticles.
Figure 3:
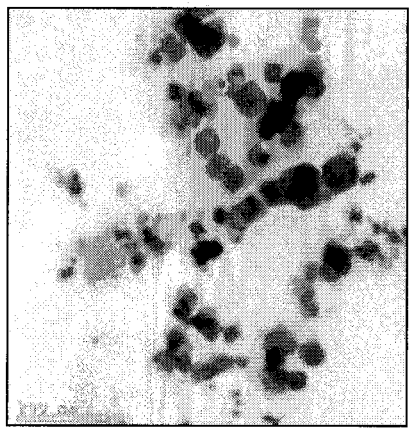
FIG. 3 is a TEM micrograph showing the morphology of a first exemplary nanocomposite comprising cobalt nanoparticles.
Figure 4:
FIG. 4 is a TEM micrograph showing the morphology of a first comparative nanocomposite comprising silver nanoparticles.

FIG. 1 is a TEM micrograph of the nanocomposite of Example 1.
FIG. 2 is a TEM micrograph of the nanocomposite of Example 3.
FIG. 3 is a TEM micrograph of the nanocomposite of Example 12.
FIG. 4 is a TEM micrograph of the nanocomposite of Comparative Example 2.
FIG. 5 is a TEM micrograph of the nanocomposite of Comparative Example 5.

Generally, all of the Examples E1-E15 had high molecular weight, whereas the Comparative Examples did not. Higher molecular weight was preferable. In addition, the angular IR reflectance increased from 12% for CE1 to 26%-35% in the Examples E1-E15. The crosslinking in CE2 was an undesired result.

Examples 20 and 21

Example E20 was made containing 1.0% silver nanoparticles according to the processes described above. Example E21 was made by melt extruding the nanocomposite of E20 with polycarbonate powder until E21 contained 0.3% silver nanoparticles. The two Examples were made into a film and coated onto a polycarbonate substrate made from the composition of CE1.

Two comparative samples were made. First, a substrate made from Comparative Example 1 (no nanoparticles) was tested without a nanocomposite film. Second, Comparative Example 7 was prepared by adding AgNO₃ to polycarbonate powder and melt blending in an extruder to obtain a composition containing 1.0 wt % silver particles. The particles in Comparative Example 7 were much larger than the nanoparticle size present in E20 and E21.

The temperature of the polycarbonate substrate was then measured while irradiated with IR light, along with other properties. The normal IR reflectance was measured at a 90° angle, while the angular reflectance was measured at a 60° angle.

Table 3 shows the results of some measurements.

TABLE 3

| Example | Metal Loading (wt %) | Film Thickness (μm) | Transmission (%) | Haze (%) | Normal IR Reflectance (%) | Angular IR Reflectance (%) |
|---|---|---|---|---|---|---|
| CE1 | 0 | | 90 | 1 | 10 | 12 |
| E20 | 1.0 | 10 | 80 | 12 | 18 | 25 |
| E21 | 0.3 | 25 | 60 | 15 | 13 | NT |
| CE7 | 1.0 | 25 | 20 | 40 | 15 | NT |

The IR reflectance increased with the nanocomposite film E20 or E21 applied to the substrate. The transmission decreased, but not to unacceptable levels. Similarly, the haze level was acceptable. In comparison, CE7, which had larger silver particles, had significantly decreased transmission and significantly increased haze.

Figure 6:
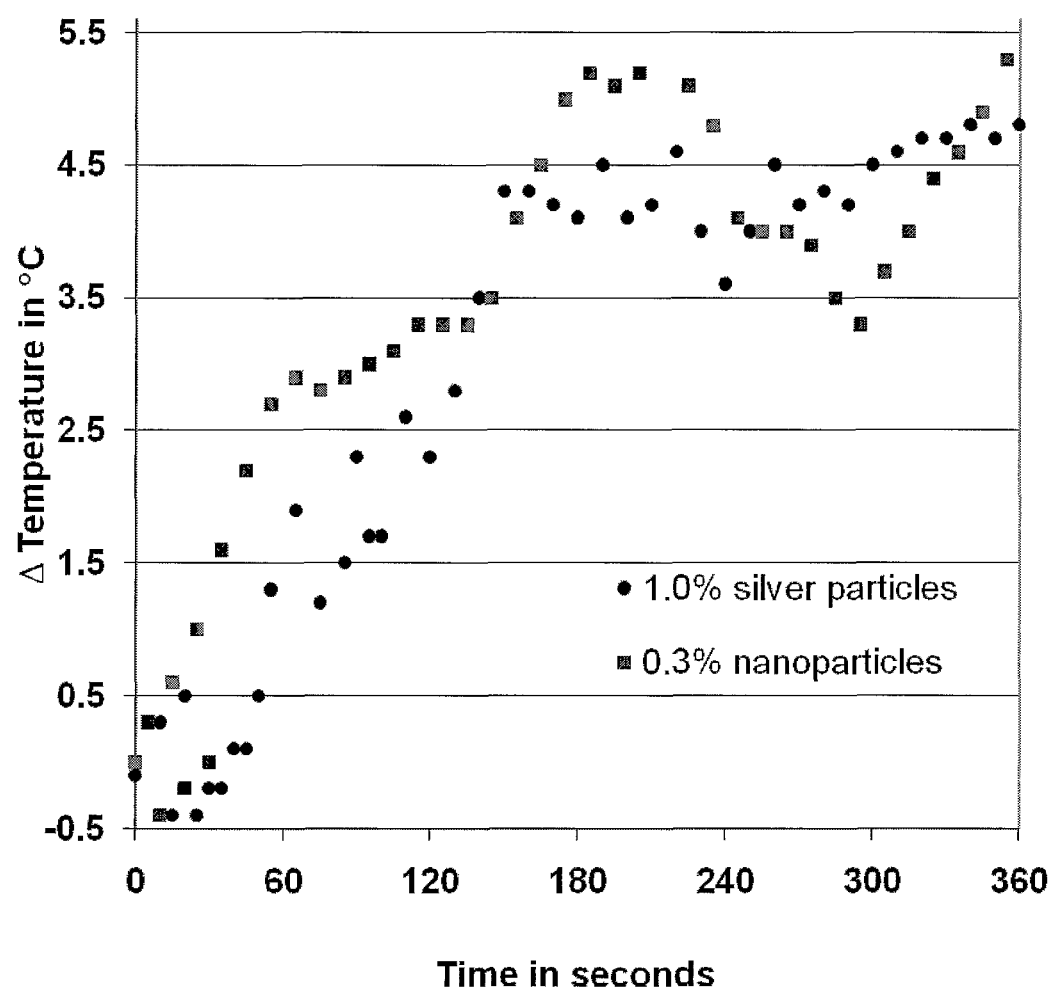
FIG. 6 is a graph showing the change in temperature of a polycarbonate substrate when a nanocomposite film is applied.

FIG. 6 is a graph showing the difference in the measured temperatures of E21 and CE7 from CE1. The squares are calculated as (E21-CE1) and the circles are calculated as (CE7-CE1). In particular, CE1 (no nanocomposite film) had the highest measured temperatures. There is as great as a 5° C. decrease in the temperature of the substrate due to the presence of the nanocomposite layer made using the methods of the present disclosure.

The polycarbonate nanocomposites and methods of the present disclosure have been described with reference to exemplary embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A method for producing a polycarbonate nanocomposite comprising:
   forming a reaction mixture comprising a dihydroxy compound, an activated carbonate, a metal precursor, and a solvent; and
   in-situ polymerizing the reaction mixture to form a polycarbonate nanocomposite comprising metal nanoparticles dispersed within a polycarbonate matrix, the metal nanoparticles being formed from the metal precursor;
   wherein the metal precursor is a salt comprising a metal selected from the group consisting of cobalt, rhodium, iridium, copper, silver, gold, platinum, palladium, and combinations thereof; and
   wherein the in-situ polymerizing step comprises maintaining the reaction mixture at a first temperature and a first pressure for a first period of time, then maintaining the reaction mixture at a second temperature and a second pressure for a second period of time, the first temperature being lower than the second temperature.

2. The method of claim 1, wherein the solvent is a polar solvent.

3. The method of claim 1, wherein the reaction mixture further comprises a stabilizer.

4. The method of claim 3, wherein the stabilizer is selected from the group consisting of, nano-sized fillers, polymeric coordinating stabilizers, and organosilanes.

5. The method of claim 1, wherein the boiling point of the solvent is equal to or greater than the melting point of the activated carbonate.

6. The method of claim 1, wherein the polycarbonate has a weight average molecular weight of from about 30,000 to about 150,000 as measured using polystyrene standards.

7. The method of claim 1, wherein the metal nanoparticles comprise 5 weight percent or less of the polycarbonate nanocomposite, based on the weight of the polycarbonate nanocomposite.

8. The method of claim 1, wherein the metal nanoparticles have a particle size of from about 1 nanometer to about 500 nanometers.

9. The method of claim 1, wherein the metal nanoparticles have an inter-particle distance of from about 0.5 nanometers to about 1500 nanometers.

10. The method of claim 1, wherein the dihydroxy compound has the structure of Formula (I):

$$\text{Formula (I)}$$

wherein $R_1$ through $R_8$ are each independently selected from hydrogen, halogen, nitro, cyano, $C_1$-$C_{20}$ aliphatic, $C_1$-$C_{20}$ alkyl, $C_4$-$C_{20}$ cycloalkyl, and $C_6$-$C_{20}$ aryl; and A is selected from a bond, —O—, —S—, —SO$_2$—, $C_1$-$C_{12}$ alkyl, $C_6$-$C_{20}$ aromatic, $C_6$-$C_{20}$ cycloaliphatic, and $C_1$-$C_{20}$ aliphatic.

11. The method of claim 1, wherein the dihydroxy compound is 2,2-bis(4-hydroxyphenyl) propane (bisphenol-A).

12. The method of claim 1, wherein the activated carbonate has the structure of Formula (II):

$$\text{Formula (II)}$$

wherein Q and Q' are independently selected from alkoxycarbonyl, halogen, nitro, amide, sulfone, sulfoxide, imine, and cyano; Ar and Ar' are independently aromatic rings; n and n' are independently whole numbers from zero up to the number of replaceable hydrogen groups substituted on the aromatic rings Ar and Ar', wherein (n+n')≥1; p and p' are integers; and R and R' are independently selected from alkyl, substituted alkyl, cycloalkyl, alkoxy, aryl, alkylaryl having from 1 to 30 carbon atoms, cyano, nitro, halogen, and carboalkoxy.

13. The method of claim 1, wherein the activated carbonate is bis(methylsalicyl)carbonate.

14. A method for producing a polycarbonate nanocomposite comprising:
   forming a reaction mixture comprising a dihydroxy compound, an activated carbonate, a metal precursor, and a solvent; and
   in-situ polymerizing the reaction mixture to form a polycarbonate nanocomposite comprising metal nanoparticles dispersed within a polycarbonate matrix;
   wherein the metal precursor is a salt comprising a metal selected from the group consisting of cobalt, rhodium, iridium, copper, silver, gold, platinum, palladium, iron, nickel, manganese, samarium, neodymium, praseodymium, gadolinium, titanium, zirconium, silicon, indium, scandium, yttrium, lanthanum, cerium, promethium, europium, terbium, holmium, erbium, thulium, ytterbium, lutetium, and combinations thereof;
   wherein the in-situ polymerizing step comprises maintaining the reaction mixture at a first temperature of from about 50° C. to about 230° C. and a first pressure of from about 800 millibar to about 1100 millibar for a first period of from about 15 minutes to about 60 minutes; and
   maintaining the reaction mixture at a second temperature for a second period of time, the first temperature being lower than the second temperature.

15. The method of claim 14, wherein the second temperature is from about 210° C. to about 250° C., the second pressure is from about 50 millibar to about 220 millibar, and the second period is from about 5 minutes to about 65 minutes, the second temperature being greater than the first temperature.

16. The method of claim 15, wherein the in-situ polymerizing step further comprises maintaining the reaction mixture at a third temperature of from about 270° C. to about 310° C. and a third pressure of less than about 30 millibar for a third period of from about 5 minutes to about 35 minutes, the third temperature being greater than the second temperature and the third pressure being lower than the second pressure.

17. A method for producing a polycarbonate nanocomposite during polymerization, comprising:
forming an initial mixture comprising a dihydroxy compound and an activated carbonate;
reacting the initial mixture to form a reaction mixture comprising a low molecular weight polycarbonate;
adding a metal precursor and a solvent to the initial mixture to form a reaction mixture, wherein the metal precursor is a salt comprising a metal selected from the group consisting cobalt, rhodium, iridium, copper, silver, gold, platinum, palladium, iron, nickel, manganese, samarium, neodymium, praseodymium, gadolinium, titanium, zirconium, silicon, indium, scandium, yttrium, lanthanum, cerium, promethium, europium, terbium, holmium, erbium, thulium, ytterbium, and lutetium, and combinations thereof; and
heating the reaction mixture to form a polycarbonate nanocomposite during polymerization comprising a high molecular weight polycarbonate and metal nanoparticles, the metal nanoparticles being formed from the metal precursor;
wherein the low molecular weight polycarbonate has a weight average molecular weight in the range of from about 8,000 to about 12,000, measured according to polystyrene standards; and
wherein the high molecular weight polycarbonate has a weight average molecular weight in the range of from about 20,000 to about 200,000, measured according to polystyrene standards.

18. The method of claim 17, wherein the metal precursor comprises a metal selected from the group consisting of cobalt, rhodium, iridium, copper, silver, gold, platinum, and palladium.

19. The method of claim 17, wherein the heating step is performed by:
maintaining the reaction mixture at a first temperature of from about 50° C. to about 230° C. and a first pressure of from about 800 millibar to about 1100 millibar for a first period of from about 15 minutes to about 60 minutes;
maintaining the reaction mixture at a second temperature of from about 210° C. to about 250° C. and a second pressure of from about 50 millibar to about 220 millibar for a second period of from about 5 minutes to about 65 minutes, the second temperature being equal to or greater than the first temperature; and
maintaining the reaction mixture at a third temperature of from about 270° C. to about 310° C. and a third pressure of less than about 30 millibar for a third period of from about 5 minutes to about 35 minutes, the third temperature being greater than the second temperature and the third pressure being lower than the second pressure.

20. The method of claim 1, wherein the in-situ polymerizing step further comprises maintaining the reaction mixture at a third temperature and a third pressure for a third period of time, the third temperature being greater than the second temperature and the third pressure being lower than the second pressure.

* * * * *